United States Patent
Krasowski

(10) Patent No.: US 11,655,928 B2
(45) Date of Patent: May 23, 2023

(54) DEVICE FOR REHABILITATING A PIPELINE BY MEANS OF A PLASTIC LINING

(71) Applicant: Bernd-Jan Krasowski, Laussnitz (DE)

(72) Inventor: Bernd-Jan Krasowski, Laussnitz (DE)

( * ) Notice: Subject to any disclaimer, the term of this patent is extended or adjusted under 35 U.S.C. 154(b) by 701 days.

(21) Appl. No.: 16/604,577

(22) PCT Filed: Apr. 11, 2018

(86) PCT No.: PCT/DE2018/100337
§ 371 (c)(1),
(2) Date: Feb. 22, 2020

(87) PCT Pub. No.: WO2018/188698
PCT Pub. Date: Oct. 18, 2018

(65) Prior Publication Data
US 2020/0224812 A1    Jul. 16, 2020

(30) Foreign Application Priority Data

Apr. 12, 2017 (DE) .......................... 102017107977.7

(51) Int. Cl.
| | |
|---|---|
| *F16L 55/165* | (2006.01) |
| *F16L 55/38* | (2006.01) |
| *F16L 55/40* | (2006.01) |
| *B29C 71/04* | (2006.01) |
| *F16L 101/18* | (2006.01) |

(52) U.S. Cl.
CPC .......... *F16L 55/1653* (2013.01); *B29C 71/04* (2013.01); *F16L 55/165* (2013.01); *F16L 55/38* (2013.01); *F16L 55/40* (2013.01); *F16L 2101/18* (2013.01)

(58) Field of Classification Search
CPC ...... F16L 55/165; F16L 55/1653; F16L 55/48
See application file for complete search history.

(56) References Cited

U.S. PATENT DOCUMENTS

| | | | | |
|---|---|---|---|---|
| 5,686,674 | A | * | 11/1997 | Lowry .................... E21B 23/08 92/92 |
| 11,118,716 | B2 | * | 9/2021 | Kanres ..................... F16L 55/18 |
| 2010/0051168 | A1 | * | 3/2010 | Moeskjaer ............ F16L 55/165 156/64 |
| 2018/0106413 | A1 | * | 4/2018 | Kuzniar .................. F16L 55/18 |

(Continued)

FOREIGN PATENT DOCUMENTS

| | | | | |
|---|---|---|---|---|
| AU | 2014354562 | A1 * | 12/2015 | ............... B63G 8/00 |
| CA | 2792814 | A1 * | 10/2011 | ............... F21K 9/00 |
| DE | 4205113 | C1 | 4/1993 | |

(Continued)

*Primary Examiner* — Frederick L Lagman
(74) *Attorney, Agent, or Firm* — Michael Soderman

(57) ABSTRACT

In an apparatus for pipeline renovation using a lining fiber tube impregnated with a reactive resin that cures under the effect of light-emitting devices, the apparatus has a head part 1 made of a transparent, temperature-resistant material, and end caps 2, 3 seal the apparatus hermetically against the outside, wherein the whole apparatus or at least its head part 1 is filled with a transparent, flame-retardant insulating fluid 5 and the apparatus contains an insert whose insulating substrates 8 are populated with high-performance light-emitting diodes 9.

16 Claims, 3 Drawing Sheets

(56) References Cited

U.S. PATENT DOCUMENTS

2018/0229404 A1* 8/2018 Starr .................. B29C 73/10

FOREIGN PATENT DOCUMENTS

| | | |
|---|---|---|
| DE | 19817413 C2 | 10/1999 |
| DE | 102007038197 A1 | 2/2009 |
| DE | 102007052915 A1 | 5/2009 |
| DE | 102010013286 A1 | 9/2011 |
| EP | 1959183 A1 | 8/2008 |
| EP | 2129956 B1 | 8/2008 |
| EP | 2916061 A1 | 9/2015 |
| EP | 3795880 A1 * | 3/2021 .............. B63G 8/00 |
| WO | 2005103121 A1 | 11/2005 |

* cited by examiner

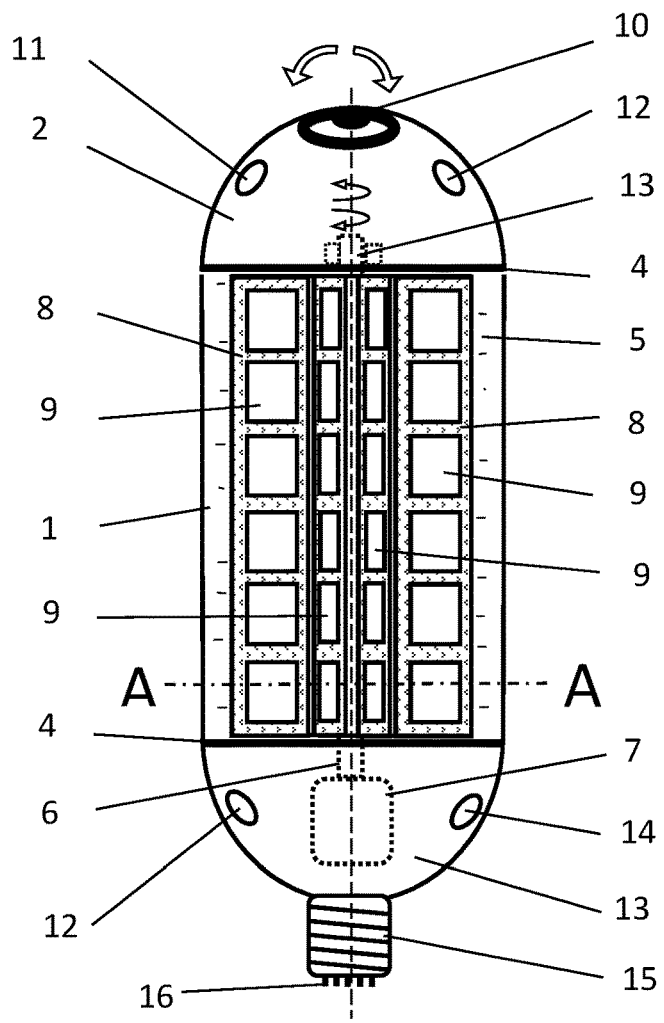
Fig. 1
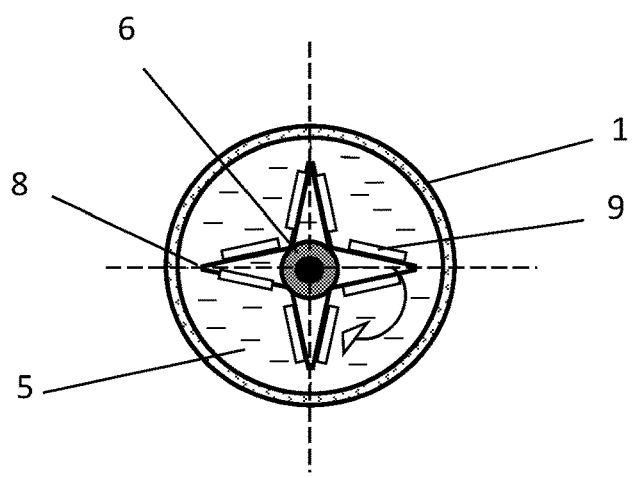
Fig. 2 (Section A-A)

DEVICE FOR REHABILITATING A PIPELINE BY MEANS OF A PLASTIC LINING

CROSS REFERENCE TO RELATED APPLICATIONS

This application is the U.S. national stage of International Application No. PCT/DE2018/100337, filed on 2018 Apr. 11. The international application claims the priority of DE 102017107977.7 filed on 2017 Apr. 12; all applications are incorporated by reference herein in their entirety.

BACKGROUND

The invention relates to an apparatus for pipeline renovation using a plastic liner impregnated with a reactive resin that cures under the influence of radiation by light emitting components.

In the renovation process, a multilayer tubular structure, a so-called liner, with at least one layer impregnated with a radiation curable resin is introduced uncured into the pipeline section to be renovated and pressed flat against the pipeline using compressed air. Thereafter, the resin adjusted to the wavelength of the radiation source cures by means of a movable, high-energy radiation source whose speed is matched to the radiation intensity of the light source. The radiation source may emit infrared or IR light, visible light or UV light and preferably consists of several devices or assemblies.

A radiation source for irradiating inner walls of elongated cavities is known from DE 42 05 113 C1, including a carriage whose central support is fitted with several UV lamps distributed circumferentially. This type of UV lamps does not need cooling.

DE 198 17 413 C2 describes a method and apparatus for pipeline renovation by introducing a fiber tube impregnated with a UV curable resin, wherein the rate of travel of a UV lamp assembly is automatically controlled as a function of the temperature generated on the inner tube surface by the exothermal curing reaction.

UV light emitting diodes are known from WO 2005/103121 A1.

DE 10 2007 052 915 A1 shows an apparatus for curing plastic liners for sewer renovation, including at least one UV light source and provided with rollers to support the apparatus inside the pipe and a video camera at each end. Circumferentially distributed IR temperature sensors capture the exothermal polymerization that occurs in the curing process. Thus, this prevents generation of excessive temperatures in the curing process, which may destroy the lining process.

For pipe renovation using a fiber tube of more than 10 mm wall thickness, impregnated with curable resin containing a UV initiator and an organic peroxide, DE 101 22 566 B4 envisages a light source intensity of least 800 watts/m$^2$, with two UV lamps arranged in tandem and each providing at least 400 W/m$^2$ of power.

According to EP 1 959 183 A1 and EP 2 129 956 B1, a plurality of flat or curved wall surface elements with high-performance light-emitting diodes disposed thereon are provided for pipe renovation by means of an apparatus and whose large-format heat sinks are recessed towards the center of the apparatus to form a duct through which a cooling fluid is made to flow by means of a pump or a fan. The wall surface elements arranged in a ring or polygon shape may be protected from mechanical stress by beaded rims or an additional transparent outer shell. A video camera is positioned at the front of the apparatus that consists of several parts.

Another method and device for pipeline renovation by introducing a fiber tube impregnated with a light-curable reactive resin is known from DE 10 2007 038 197 A1, wherein the light-emitting diodes are arranged on a tubular or helical support in several parallel ring-shaped or helical areas, with the light-emitting diodes horizontally or circumferentially staggered with respect to each other on the adjacent areas. A cooling device is not disclosed.

SUMMARY

In an apparatus for pipeline renovation using a lining fiber tube impregnated with a reactive resin that cures under the effect of light-emitting devices, the apparatus has a head part 1 made of a transparent, temperature-resistant material, and end caps 2, 3 seal the apparatus hermetically against the outside, wherein the whole apparatus or at least its head part 1 is filled with a transparent, flame-retardant insulating fluid 5 and the apparatus contains an insert whose insulating substrates 8 are populated with high-performance light-emitting diodes 9.

DETAILED DESCRIPTION

The invention is based on the object to create an apparatus for pipeline renovation using a lining fiber tube impregnated with a reactive resin that cures under the influence of radiation from light-emitting devices, wherein the apparatus is equipped with high-performance light-emitting diodes as a self-contained fluid-cooled system, increasing a temperature-controlled passing speed in the fiber tube and dispensing with the incorporation of cost-driving metallic heat sinks, supply lines and incorporation of cooling fluid lines, pumps and fans.

According to the invention, the object is solved by the apparatus having a head part made of a transparent, temperature-resistant material, end caps sealing the apparatus hermetically at either end face, wherein the whole apparatus or at least its head part is filled with an opaque or transparent flame-retardant insulating fluid, and wherein the apparatus has an insert whose insulating substrates are populated with high-performance light-emitting diodes.

Advantageously, the insert is rotationally symmetrical along the longitudinal axis of the apparatus and can be driven by means of a shaft or hydraulic line.

According to a preferred embodiment, the insert has insulating substrates projecting radially, in a star-shape or convexly and provided with conductor tracks and which are populated with high-performance light-emitting diodes in the head part area.

According to another embodiment, the insert has one or several wings or arcs of insulating substrates populated on both sides.

Preferably, the insert supports a star of three to six, preferably four, insulating substrates 5 populated on both sides.

In a further embodiment of the invention, an insulating support which is populated on one side in a flat state has folding zones and, in the mounted state, forms a radially projecting star-shaped structure with high performance light-emitting diodes disposed on its outside.

According to a preferred embodiment, the insert is driven by a closed-loop controllable electric motor installed in one of the end caps, the insert then rotating at a specific speed. However, the insert can also be driveless or stationary.

A further development of the invention has a pivotable video camera disposed in and/or on one end cap. If one video camera each is disposed in and on the end cap, this allows better monitoring because two simultaneous views can be compared.

In addition, both end caps are preferably fitted with sensors to capture at least the reaction temperature at or inside the fiber tube, the air temperature inside the pipe, the temperature of the insulating fluid and the compressed air inside the pipe during the curing process and to report these to a central control station.

In a further embodiment, the rear end cap has a combined mechanical-electrical connector for a flexible cable or push-rod cable, via which connector an existing electric motor, the video camera, the high-performance light-emitting diodes and the sensors are supplied, the supply lines being routed to the front end cap through the hollow shaft. However, the connector may also be electro-hydraulic, having a pushrod hydraulic line, with the supply lines routed through the hollow shaft or the hydraulic line or along the shaft or hydraulic line.

According to a further embodiment, only one of the end caps besides the head part of the apparatus is filled with insulating fluid.

Both a mineral oil and an organic ester are suitable insulating fluids.

The high-performance light-emitting diodes are matched in wavelength to the reactive resin used in the fiber tube. However, they may also be arranged to radiate at different wavelengths and/or different light intensities along their extension. They may be mounted e.g. by direct wire bonding and potting of the chips, as surface-mounted devices or in a wire-mounting and soldering technique on insulating substrates.

Advantageously, the head part has a rotationally symmetrical cylindrical or polygonal or convex cross-section.

In a further development of the invention, one or several downstream fluid accumulators are connected with the head part to recirculate the insulating fluid by means of a pump.

The insert itself may be of a helical shape and be driven only by the insulating fluid.

The invention achieves various advantages over the prior art, in particular high electrical loading capacity by arrangement of the components in a separate insulating fluid, a high electrical insulation factor, high resistance to vibrations and shocks, high corrosion protection, moreover an extended range of the apparatus due to the elimination of air or water supply lines, long service life due to the compact construction as well as uniform and improved cooling of the high-performance diodes as well as further advantages as discussed in detail in the exemplary embodiment.

BRIEF DESCRIPTION OF THE DRAWINGS

The invention is now explained by means of an exemplary embodiment. In the drawings:

FIG. 1 shows a total view of an apparatus,

FIG. 2 shows a cross-section A-A through the apparatus of FIG. 1,

DETAILED DESCRIPTION OF THE PREFERRED EMBODIMENTS

Figure 3:
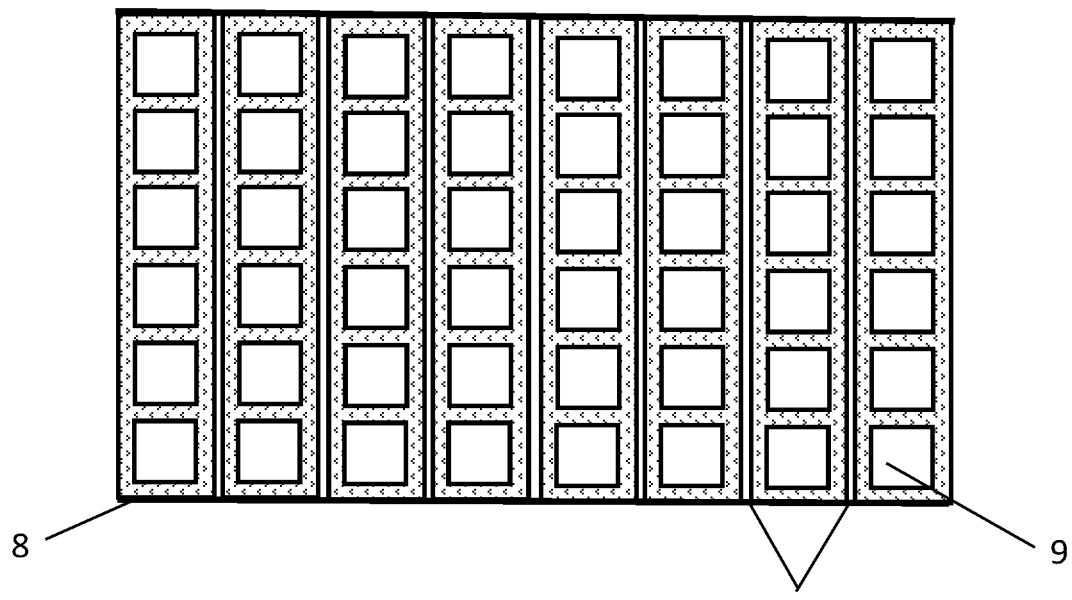
FIG. 3 shows an example of an insulating substrate 8 populated with high performance light-emitting diodes 9 on one side.

According to FIG. 1, the apparatus has a head part 1, preferably of a circular cross-section, made of a heat-resistant, transparent material, such as glass or a suitable plastic material, the open ends of which head part are sealed fluid-tight by two end caps 2, 3 of a VA material or aluminum. To improve tightness, sealing elements 4 may be provided between the edges of head part 1 and end caps 2, 3. Head part 1 and both end caps 2, 3 thus form an outwardly tight vessel. The apparatus is filled with an opaque or transparent heat-resistant cooling and insulating fluid 5. Suitable insulating fluids 5 are e.g. transformer oils, capacitor oils, other suitable mineral oils or organic esters.

Insulating fluid 5 fills the whole apparatus; however, in a particular embodiment of the invention, it may also be envisaged that only head part 1 is filled or head part 1 and only one of the end caps 2, 3 are filled. In such a case, the other one or both end caps 2, 3 are sealed off from head part 1 by a partition (not shown). Inside the apparatus, an insert is supported whose shaft 6 can be driven by an electric motor 7 in both rotational directions in a continuously variable or cyclic manner. The rotational direction and rotational speed of shaft 6 can be controlled automatically such that the torque of the insert can be closed-loop controlled or changed automatically. According to a particular embodiment of the invention, the motor drive is eliminated and shaft 6 remains idle or the insert is driven solely by the moving insulating fluid 5 as a result of a special helical shape (not shown) or is moved by recirculating said insulating fluid by means of a pump.

In the area of head part 1, the insert carries substantially radially projecting insulating substrates 8 provided with conductor tracks and preferably populated with high-performance light-emitting diodes (H-LED) 9 in surface-mount design (H-SMD-LED). The high-performance light-emitting diodes 9 can advantageously be mounted by direct wire bonding of the high-performance light-emitting diode chips (H-COB-LED) to the insulating substrates 8. Alternatively, light-emitting diodes in a transparent package and fitted with pins and a reflector are used. Both printed circuit boards and printed circuit films could conceivably be used as insulating substrates 8. The wavelength of light-emitting diodes 9 is matched to the resin to be cured and impregnating the lining, i.e., fiber tube. Both UV-emitting diodes of e.g. 420 mm wavelength and IR-emitting high-performance diodes may be used.

Both end caps 2, 3 accommodate further functional elements of the apparatus, besides the optionally provided electric motor 7 in rear end cap 3. Thus, front end cap 2 has a controllable video camera 10, a sensor 11 for capturing the air temperature, an IR sensor 12 for detecting the reaction temperature of the liner and a shaft end support 13 for the shaft end of shaft 6. Inside rear end cap 3, there is another IR sensor 12 to capture the temperature of the liner, a pressure sensor 14 to capture the air pressure inside the liner closed at the end and, optionally, a second video camera.

Furthermore, a temperature sensor may be provided to capture the temperature of insulating fluid 5 within the apparatus. End cap 3 has a threaded connection 15 with an integrated electrical connector 16 mounted thereon, to which a suitable electrical cable or more rigid pushrod cable 21 can be connected. Via this cable, electric motor 7 of the apparatus, video camera 10 and high-performance light-emitting diodes 9 are supplied with power and controlled, the sensor electronics is supplied and the data of sensors 11, 12, 14 is forwarded to a central external computer-assisted workplace.

According to FIG. 1 in conjunction with FIG. 2 and FIG. 3, shaft 6 of the insert carries a light-emitting star made of an insulating substrate 5 populated with high-performance light-emitting diodes 9. In the example, insulating substrate 5 consists of individual printed circuit boards electrically and mechanically connected to each other through hinge zones 17 and on each of which 6 high-performance COB-LEDs are bonded on one side in the flat state of insulating substrate 5. The star-shaped folding structure in the state as mounted on shaft 6 is particularly clearly seen in FIG. 2, which shows a cross-section A-A through the apparatus according to FIG. 1. The insert with high-performance light-emitting diodes 9 disposed on the outer surfaces of insulating substrate 5 is within the flow of a transparent, heat-resistant insulating fluid 5 within head part 1. The flow process and thus the cooling of high-performance light-emitting diodes 9 can be reinforced if the insert is driven by a motor 7, specifically a controllable electric motor with bidirectional rotation. The insert can also be helical, then rotating by itself as a result of being within the flow of insulating fluid 5 or of the insulating fluid 5 being recirculated by a pump.

Figure 4:
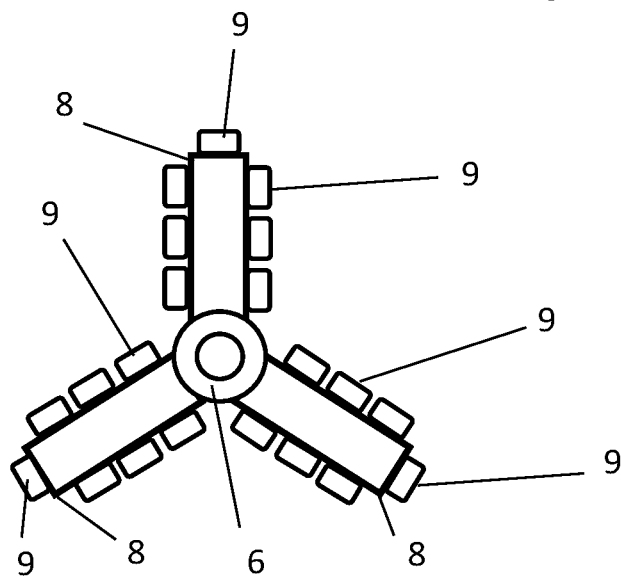
FIG. 4 shows another example of a population with high performance light-emitting diodes 9.

FIG. 4 shows a cross-section through another insert. The stationary axis or rotating shaft 6 of the insert is provided with an insulating foil folded into a star or provided with assembled insulating plates that form insulating substrates 8 for circumferentially distributed high-performance light-emitting diodes 9.

Figure 5:
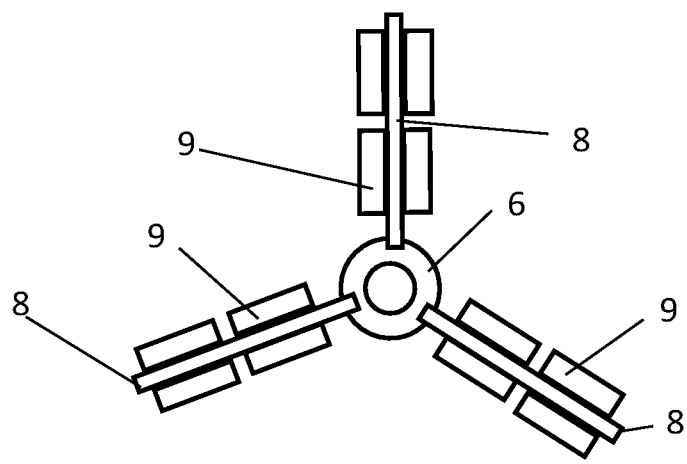
FIG. 5 shows an example of an insert whose PCBs are populated on both sides with high performance light-emitting diodes 9.

FIG. 5 presents a first variant within the inventive idea, where individual printed circuit boards as insulating substrates 8 are populated with high performance light-emitting diodes 9 on both sides. The insulating printed circuit boards are advantageously fitted directly to shaft 6 of an insert. The example shows three printed circuit boards projecting in a star-shaped manner; however, there may be two, four or more.

Figure 6:
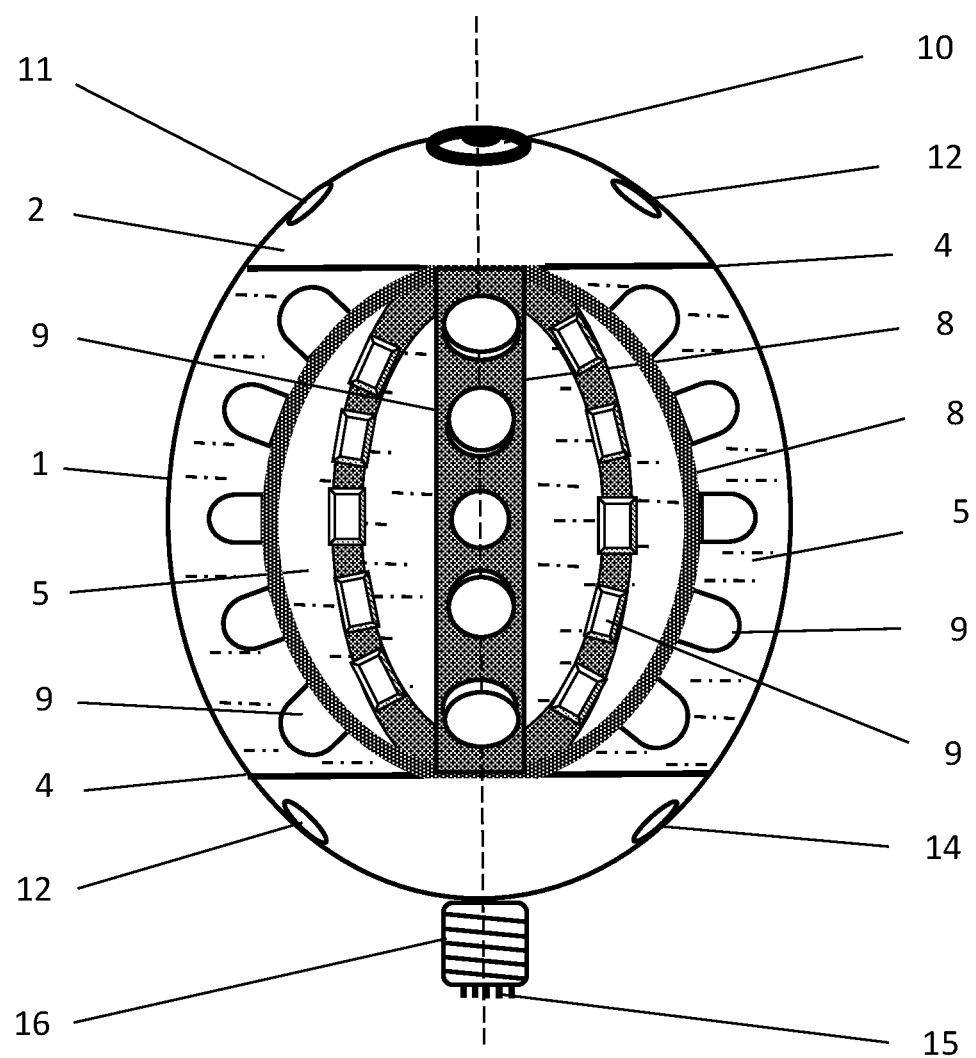
FIG. 6 shows an example of an apparatus in a spheroidal design with convex insulating substrates 8 populated on one side.

FIG. 6 shows the view of an egg-shaped apparatus (this may also be spherical), where head part 1 is of a convex, but rotationally symmetrical shape and ends with end caps 2, 3 using sealing elements 4. End caps 2, 3 in turn accommodate sensors 10, 11, 12, 14 and, like head part 1, are filled with a cooling and insulating fluid 5. The insert carries several insulating substrates 8, in the example eight, arching circumferentially around shaft 6 of the insert like barrel staves. In the example, insulating substrates 8 carry high-performance light-emitting diodes 9 of different power/light intensity, for example, increasing from 10 W to 30 W from the center outwards and/or of different wavelengths emitted and/or of different construction types, in particular, to ensure that the fiber tube is uniformly irradiated despite the egg shape or spherical shape of the apparatus.

The insert can be stationary or rotate axially around a shaft (not visible) driven by an electric motor. Alternatively, the insert can rotate by means of a recirculating insulating fluid, either on its own as a result of intrinsic heat development of insulating fluid 5 or by recirculation pumping within the apparatus. For this purpose, the insert is preferably of a helical shape.

It will be understood that head part 1 does not need to be circular in cross-section, but may also be polygonal, such as hexagonal or octagonal, and be straight, convex or waisted along its longitudinal axis. The inserts are shaped correspondingly.

As in FIG. 1, individual high-performance light-emitting diodes 9 are connected to electrical connector 16 via cable feeds in variations of series and/or parallel circuits. The cable to the electrical components inside front end cap 2 leads from electrical connector 16 through shaft 6, here designed as a hollow shaft. For the first time, the power of an apparatus can be designed to reach up to 1000 W/m$^2$, wherein the power can be ramped down incrementally or continuously to e.g. 800 W, 600 W or 400 W as necessary, for example, depending on flow rate, nominal width of the pipe and the properties of the lining, i.e., resinated fiber tube. During the curing process, the fiber tube should not be subjected to more than 180° C. in order to avoid damage by charring or burning.

Figure 7:
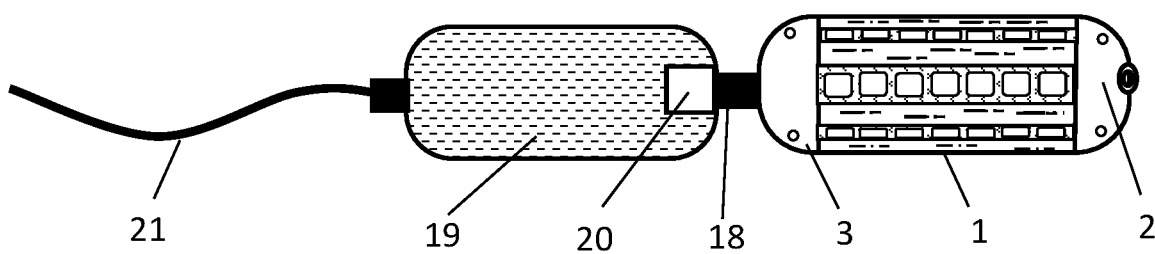
FIG. 7 shows an example of an apparatus with fluid accumulator 19 docked thereto.

Finally, FIG. 7 presents an extended variant consisting in a fluid accumulator 19, together with a pump 20 disposed therein or thereon, docked to apparatus 1 via a coupling 18 to be able to recirculate insulating fluid 5 and thus to better cool insulating fluid 5. Also, several other fluid accumulators 19 can be disposed as a kind of additional coolers. Accumulators 19 can additionally be provided with cooling fins to allow better dissipation of the heat from the insulating fluid to the air inside the pipe. Thus, insulating fluid 5 cools the high-performance diodes 9 particularly well. This has the advantage that curing can be performed at very high power without any possible overheating of high-performance light-emitting diodes 9 because the heat is optimally dissipated from the head part by recirculation pumping. Another advantage results from the fact that, when the insert is appropriately designed, the flow of insulating fluid 5 causes it to rotate forcefully around a shaft even without being driven by an electric motor, resulting in a very uniform irradiation and thus curing of the fiber tube. The rear end of fluid accumulator 19 has a flexible or rigid supply cable 21 connected thereto, which can also be designed as a pushrod cable 21.

The described apparatus is part of an overall system consisting of:
1. Control unit
1.1 Electrical control station with PC, monitor and keyboard
1.2 Electrical controller for the high-performance light-emitting diodes
2. Reel with electric drive and a flexible cable or pushrod cable
2.1. Electromechanical speed control system
2.2 Reel frame with rollers
3. High-performance light-emitting diode apparatus with IR fiber tube temperature measurement, IR air temperature measurement, air pressure measurement, TV camera, radiant star of light-emitting diodes.

The linear speed of the apparatus is monitored in a "heating mode" using closed-loop control techniques and run according to specifications of the liner manufacturer. The winding function of the system is automatic.

In summary, the complete oil immersion of all mechanical and electrical/electronic/optoelectronic components in an insulating fluid 5 in the case of a complete filling of the apparatus, i.e. of head part 1 including both end caps 2, 3, results in the following advantages:

Very fast liner (fiber tube) curing due to high radiation power

Outstanding insulation values between the high-performance diodes and the other components Excellent component protection against corrosion and short-circuits Excellent protection against overheating of individual high-performance light-emitting diodes and their assemblies as a result of effective heat dissipation via the insulating fluid Use of the apparatus in higher temperatures than usual and thus faster stabilization of the liner tube Improved mechanical protection of all components against external effects such as shocks Prevention of partial temperature peaks that adversely affect the efficiency and service life of the high-performance light-emitting diodes Additional improvement of cooling if the insert is rotationally driven by a motor Possibility to create a rotational drive solely by the insulating fluid No dragging of cooling lines due to a closed cooling system

LIST OF REFERENCE NUMERALS

1 Head part
2 Front end cap
3 Rear end cap
4 Sealing element
5 Insulating fluid
6 Shaft or hydraulic line
7 Motor, electric or hydraulic motor
8 Insulating substrate
9 High-performance light-emitting diode
10 Video camera
11 Air temperature sensor
12 IR sensor
13 Shaft end support
14 Air pressure sensor
15 Threaded connection or coupling
16 Electrical connector
17 Hinge zone
18 Coupling piece
19 Fluid accumulator
20 Pump
21 Cable

What is claimed:

1. An apparatus for pipeline renovation using a lining fiber tube impregnated with a reactive resin that cures under the influence of light-emitting devices,
characterized in that
the apparatus has a head part (1) made of a transparent, temperature-resistant material, end caps (2, 3) at both end faces seal the apparatus hermetically against the outside, the whole apparatus or at least its head part (1) is filled with an opaque or transparent flame-retardant insulating fluid (5) and the apparatus accommodates an insert whose insulating substrate (8) has high performance light-emitting diodes (9) disposed thereon and wherein
the insert is rotationally symmetrical along the longitudinal axis of the apparatus and is driven by means of a shaft or hydraulic line (6).

2. The apparatus according to claim 1,
characterized in that
the insert has insulating substrates (8) that project radially, in a star-shape or convexly and are populated with high-performance light-emitting diodes (9) in the head part (1) area.

3. The apparatus according to claim 1,
characterized in that
the insert carries one or several wings or arcs of insulating substrates (8) populated on one or both sides.

4. The apparatus according to claim 1,
characterized in that
the insert is formed in a star shape of three to six insulating substrates (8) populated on both sides.

5. The apparatus according to claim 1,
characterized in that
an insulating substrate (8) populated on one side in a flat state has folding zones and, in the mounted state, forms a radially projecting, star-shaped structure with high-performance light-emitting diodes (9) disposed on its outside.

6. The apparatus according to claim 1,
characterized in that
one of the end caps (2, 3) accommodates a closed-loop controllable electric motor (7) for driving the shaft (6).

7. The apparatus according to claim 1,
characterized in that
a pivotable video camera (10) is disposed in and/or on at least the front end cap (2).

8. The apparatus according to claim 1,
characterized in that
sensors (11, 12, 14) are disposed in both end caps (2, 3) to capture at least the reaction temperature at or inside the fiber tube, the air temperature inside the pipe, the temperature of the insulating fluid (5) and the compressed air inside the pipe during the curing process and to report these to a central control station.

9. The apparatus according to claim 1,
characterized in that
a rear end cap (3) has a combined mechanical-electrical connector (15, 16) for a flexible cable or pushrod cable, via which connector an electric motor (7), a video camera (10), the high-performance light-emitting diodes (9) and sensors (11, 12, 14) are supplied,
or has an electro-hydraulic connector (15, 16) for a flexible or pushrod hydraulic line, with supply lines routed to a front end cap (2) through a hollow shaft or hydraulic line (6).

10. The apparatus according to claim 1,
characterized in that
the head part (1) and only one of the end caps (2 or 3) of the apparatus are filled with insulating fluid (5).

11. The apparatus according to claim 1,
characterized in that
a mineral oil or an organic ester is used as insulating fluid (5).

12. The apparatus according to claim 1,
characterized in that
the high-performance light-emitting diodes (9) are matched in wavelength to the reactive resin used in the fiber tube.

13. The apparatus according to claim 1,
characterized in that
the high-performance light-emitting diodes (9) radiate at different wavelengths and/or different light intensities along their extension.

14. The apparatus according to claim 1,
characterized in that
the head part (1) is rotationally symmetrical in cross-section, cylindrical, polygonal or convex and straight, convex or waisted along its longitudinal side.

15. The apparatus according to claim 1,
characterized in that one or several downstream fluid accumulators (19) are connected with the head part (1) to recirculate the insulating fluid (5) by means of a pump.

16. The apparatus according to claim 1, characterized in that the insert is helically shaped and driven by the flow of the insulating fluid (5).

\* \* \* \* \*